United States Patent
Furman et al.

(10) Patent No.: US 10,209,969 B1
(45) Date of Patent: *Feb. 19, 2019

(54) PROTOCOL COMPILER TO GENERATE FLIGHT CODE AND ROUTING TABLES

(71) Applicant: Kitty Hawk Corporation, Mountain View, CA (US)

(72) Inventors: Scott Furman, Menlo Park, CA (US); Chad Smith, Sunnyvale, CA (US); Brian Robert Viele, Crozet, VA (US); Patrick Kim, San Francisco, CA (US); Allen H. Ibara, San Carlos, CA (US); Dejapong Suwaratana, San Francisco, CA (US); Matthew Walker, Mountain View, CA (US); Gary Stempler, Los Gatos, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,534

(22) Filed: Aug. 1, 2018

Related U.S. Application Data

(63) Continuation of application No. 15/908,573, filed on Feb. 28, 2018, now Pat. No. 10,120,662.

(51) Int. Cl.
```
G06F 9/45      (2006.01)
G06F 8/41      (2018.01)
G06F 8/73      (2018.01)
B64F 5/60      (2017.01)
B64C 13/00     (2006.01)
```

(52) U.S. Cl.
CPC .............. *G06F 8/427* (2013.01); *G06F 8/73* (2013.01); *B64C 13/00* (2013.01); *B64F 5/60* (2017.01)

(58) Field of Classification Search
CPC .......................................................... G06F 9/45
USPC ................................................. 717/141–144
See application file for complete search history.

(56) References Cited

U.S. PATENT DOCUMENTS

| | | | | |
|---|---|---|---|---|
| 2002/0165647 A1* | 11/2002 | Glenn, III | ............... | G06F 9/451 701/3 |
| 2002/0173883 A1* | 11/2002 | Ezaki | ..................... | G06Q 10/02 701/3 |
| 2005/0251298 A1* | 11/2005 | Gvillo | ....................... | G06F 8/30 701/3 |
| 2009/0316616 A1* | 12/2009 | Laish | ................. | H04B 7/18517 370/312 |

* cited by examiner

*Primary Examiner* — Jae U Jeon
(74) *Attorney, Agent, or Firm* — Van Pelt, Yi & James LLP

(57) ABSTRACT

A protocol compiler to generate flight code and routing tables is disclosed. In various embodiments, one or more definition files are received. The one or more definition files are parsed to extract flight control system definition data. A communication topology comprising a set of entities of the flight control system and communication links between said entities is determined based on the flight control system definition data. A set of one or more routing tables is generated programmatically based at least in part on the communication topology and message type definition data. Flight code to implement a flight control system defined at least in part by said flight control system definition data is generating programmatically, based at least in part on the flight control system definition data, including code to route messages according to said one or more routing tables.

19 Claims, 6 Drawing Sheets

PROTOCOL COMPILER TO GENERATE FLIGHT CODE AND ROUTING TABLES

CROSS REFERENCE TO OTHER APPLICATIONS

This application is a continuation of co-pending U.S. patent application Ser. No. 15/908,573, entitled PROTOCOL COMPILER TO GENERATE FLIGHT CODE AND ROUTING TABLES filed Feb. 28, 2018 which is incorporated herein by reference for all purposes.

BACKGROUND OF THE INVENTION

Complex systems typically include a plurality of embedded or other component systems. For example, an electric vertical (or short) takeoff and landing (VTOL) aircraft may use a plurality of lift fans (rotors) driven by electric motors to provide vertical lift, e.g., to lift the aircraft into the air for takeoff, to hover while in flight, and/or to provide vertical lift as the aircraft lands. One or more additional electrically-driven propellers may be provided for forward flight. Additional actuators, such as ailerons and other control surfaces, may be included. Each actuator (lift fan, forward propulsion propeller, control surface, etc.) may have an associated controller configured to provide low level commands to control actuator parameters, such as RPM in the case of lift fans or propellers. Each controller may be configured to be responsive to commands received from a central flight control computer, and may further be configured to communicate actuator state and/or other information to the flight control computer. Additional systems may exist to manage batteries that power actuator motors and servos, provide power to electronic systems; receive and route sensor data; and interpret and communicate inputs provided via manual aircraft controls (inceptors) and/or autopilot computers.

Typically, flight code is developed for an aircraft via a manually intensive process, to ensure data flows between embedded systems in a deterministic, unambiguous manner and quickly enough to enable the embedded systems to be controlled to fly the aircraft in a safe and optimal manner. However, such manual processes may be error prone and can extend the development timeline for a new or improved aircraft.

BRIEF DESCRIPTION OF THE DRAWINGS

Various embodiments of the invention are disclosed in the following detailed description and the accompanying drawings.

DETAILED DESCRIPTION

Figure 1:
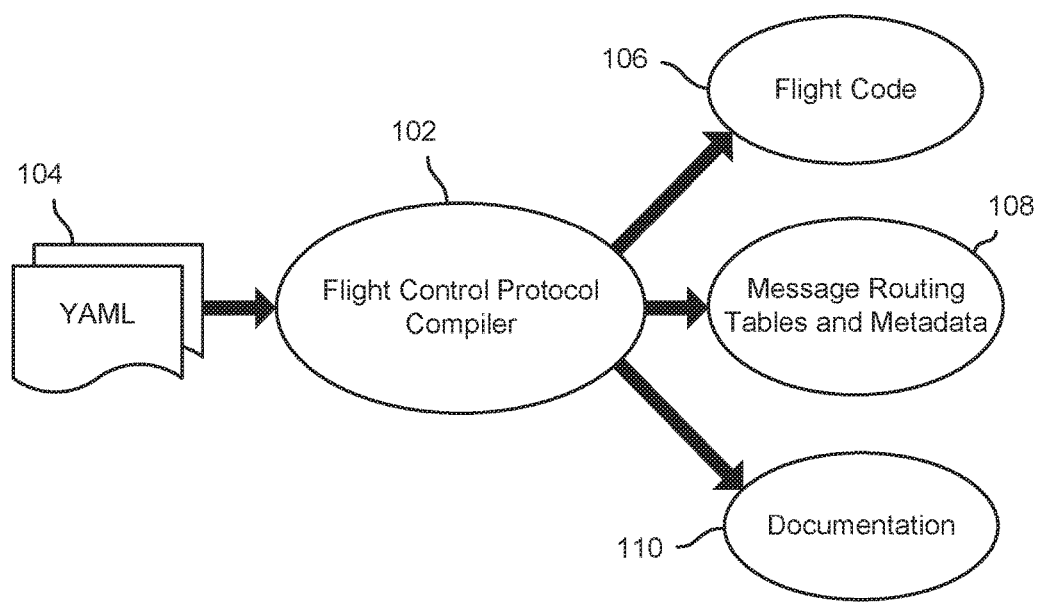
FIG. 1 is a block diagram illustrating an embodiment of a flight control protocol compiler.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A protocol compiler to generate flight code, routing tables, and other resources to provide and facilitate communication between embedded systems is disclosed. In various embodiments, a set of YAML or other definition files describing embedded systems, connections between them, and messages to be exchanged between them, are received. A protocol compiler as disclosed herein, in various embodiments, performs one or more of the following: ensures message identifiers (message IDs) are unique globally among all embedded systems, even if defined in separate definition files and/or for separate embedded systems; provides deterministic lossless compression of data values to be communicated between embedded systems over links having limited bandwidth; performs automated analysis of bandwidth associated with messages to be communicated by all embedded systems; generates routing tables to route messages, e.g., via serial switches, to destination endpoints; provides code and metadata to detect and respond to unexpected message rates, missed messages, and unexpected endpoints/destinations; automatically generate human readable documentation based on definition files; provide self-describing data entities; and detect and respond to out-of-range values observed at runtime.

In various embodiments, a protocol compiler as disclosed herein may be used to generate flight code for an electric VTOL aircraft comprising a plurality of lift fans, one or more forward propulsion propellers, ailerons and other control surfaces, and supporting systems such as battery management, low voltage power, sensors, inceptors, and other components and/or embedded systems comprising and/or otherwise associated with such components.

FIG. 1 is a block diagram illustrating an embodiment of a flight control protocol compiler. In the example shown, flight control protocol compiler 102 receives as input a set of one or more definition files 104. In various embodiments, flight control protocol compiler 102 is a software entity running on a general purpose or special purpose computer. In the example shown, definition files 104 are expressed in the YAML markup language, but in other embodiments other languages may be used. In various embodiments, definition files 104 may include any number of files. For example, a separate definition file may be provided for each of one or more different embedded systems and/or subsystems of an electric aircraft. Different engineers and/or teams of engineers may be involved in writing respective ones of the definition files 104.

As shown in FIG. 1, flight control protocol compiler 102 parses and processes the definition files 104 to generate programmatically, without human intervention, a body of flight code 106, message routing and metadata tables 108, and human-readable documentation 110. In some embodiments, the protocol compiler 102 also generates test code.

In various embodiments, flight code 106 may include software code for each of a plurality of embedded systems and/or components. For example, flight code 106 may include code to be executed by an onboard flight computer to provide control and monitoring of the aircraft. The flight code 106 may include software code to enable the flight computer to receive and interpret messages communicated by disparate embedded systems. Such messages may include, by way of example and without limitation, actuator and/or other component state information, such as actuator position and health data; battery state information, such as temperature, charge, etc.; sensor data and health; inceptor inputs, such as stick or throttle position, etc.; and/or control inputs generated programmatically for autonomous flight. Flight code 106 may include code to determine based on inceptor inputs, sensor data, etc., an optimal set of actuators to control aircraft flight, and for each a corresponding set of one or more actuator parameters. Flight code 106 may include code to generate properly formatted messages to communicate commands to controllers and/or other embedded systems configured to control actuators and/or other components.

Flight code 106 may include software code configured to use routing tables 108 and/or other metadata to route messages communicated between embedded systems. For example, software code may be generated programmatically to be executed on processors comprising one or more serial switches comprising the inter-system communication infrastructure of the aircraft to route messages between embedded systems, according to applicable routing tables 108. In some embodiments, flight code 106 generated for serial (or other) switches may be configured to use metadata generated by the flight control protocol compiler 102 to monitor during runtime messages communicated between embedded systems and to respond to observed patterns or values that deviate from those determined at compile time by the flight control protocol compiler 102 to be expected. For example, flight code 106 may include code to enable one or more of the flight computer, serial (or other) switches, and/or other entities to detect at runtime messages that include an out-of-range value for a parameter; messages sent to an unexpected destination endpoint; messages sent at a rate that exceeds an expected rate; and non-arrival of message expected to have arrived. In some embodiments, flight code 106 may include code to enable a processor executing the flight code 106 to take action in response to a message that deviates from expected patterns, such as by sending an alert, discarding (not forwarding) messages that exceed an expect rate, etc. In some embodiments, flight code 106 may include code to communicate programmatically with ground stations and/or other aircraft (or other vehicles).

In various embodiments, documentation 110 is based on definitions included in definition files 104. For example, communication topology, message definitions, and other data defined in definition files 104 may be expressed in documentation 110 in a human readable form. In various embodiments, documentation 110 generated based on definition files 104 may be more accurate, comprehensive, and/or otherwise reliable than manually generated documentation. For example, documentation 110 based on definition files 104 would include in a human readable form information about the flight code 106 and message routing tables (and other metadata) 108 as generated programmatically at compile time based on the same definition files 104. By contrast, manually created documentation may fail to include some messages, entities, and other information defined in definition files 104, and/or may not be updated fully or accurately to reflect changes made to the definition files 104.

While in the example shown in FIG. 1 flight code is generated, in other embodiments techniques disclosed herein are used to generate code for other systems, such as electric vehicles other than aircraft, autonomous vehicles, and other systems comprising subsystems that must communicate with one another programmatically.

Figure 2:
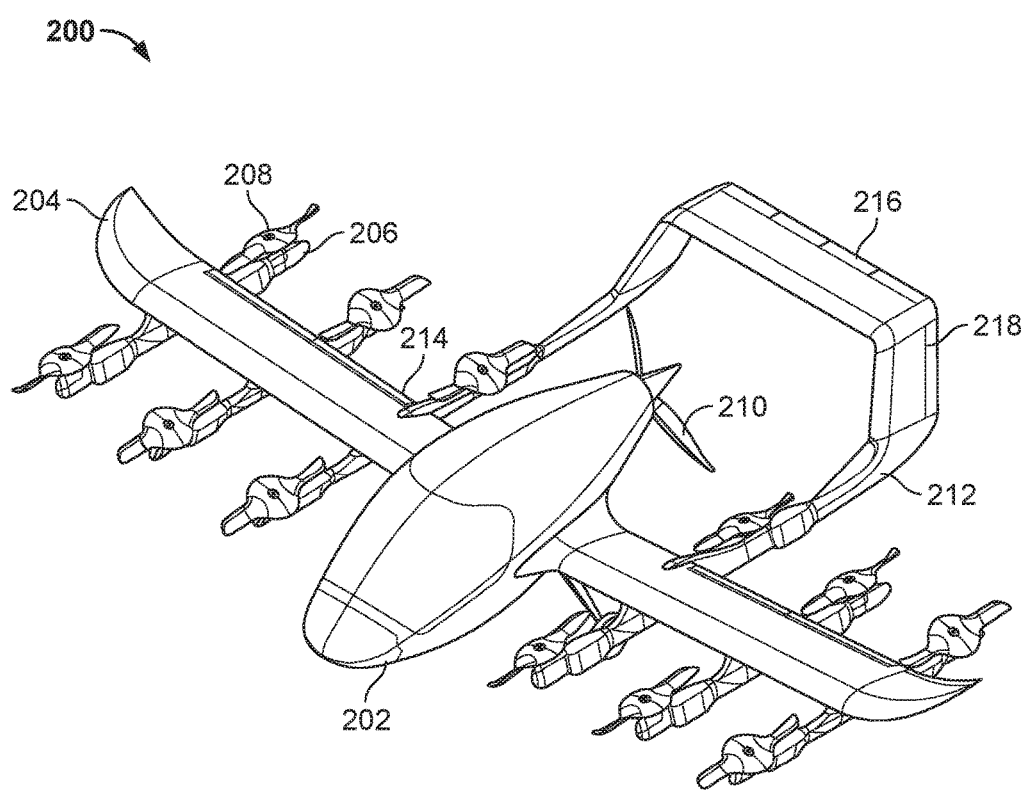
FIG. 2 is a diagram illustrating an embodiment of an electric aircraft.

FIG. 2 is a diagram illustrating an embodiment of an electric aircraft. In various embodiments, aircraft 200 of FIG. 2 includes a plurality of embedded systems running flight code generated by a flight control protocol compiler as disclosed herein, such as flight control protocol compiler 102 of FIG. 1.

In the example shown, aircraft 200 includes a fuselage (body) 202 and wings 204. A set of three underwing booms 206 is provided under each wing. Each boom 206 has two lift fans 208 mounted thereon, one forward of the wing and one aft. Each lift fan 208 may be driven by an associated drive mechanism, such as a dedicated electric motor. One or more batteries (not shown) and/or onboard power generators (e.g., solar panels) may be used to drive the lift fans 208 and/or charge/recharge onboard batteries. In the example shown in FIG. 2, propeller 210 is mounted on the fuselage 202 and configured to push the aircraft through the air in the forward (e.g., x axis) direction. The propeller 210 is positioned between a pair of booms 212 that extend aft and are joined at their aft end by a tail structure on which aerodynamic control surfaces including elevators 216 and rudder 218 are mounted. Additional control surfaces include ailerons 214 mounted on the trailing edge of wings 204.

In various embodiments, embedded systems, such as controllers, switches, and flight computers, not shown in FIG. 2, may be included in aircraft 200. For example, each lift fan 208 and propeller 210 and/or associated components, such as electric motors, may have an associated controller. In addition, each aerodynamic control surface, such as ailerons 214, elevators 216, and rudder 218, may have an associated actuator controller. In addition, batteries, battery charging systems, and low voltage power systems may include and/or be associated with embedded systems. In addition, sensors and inceptors may comprise and/or be associated with embedded systems. In various embodiments, such embedded systems comprising aircraft 200 may communicate with one another and/or with a flight computer via communications links and/or switches, such as serial switches. For example, each system may include flight code generated by a protocol compiler as disclosed herein, e.g., flight code 206 of FIG. 2, to communicate with one another via messages to provide for control and monitoring of the aircraft 200.

Aircraft 200 is just one example of an aircraft of other vehicle that may run software code generated by a protocol compiler as disclosed herein, in various embodiments.

Figure 3:
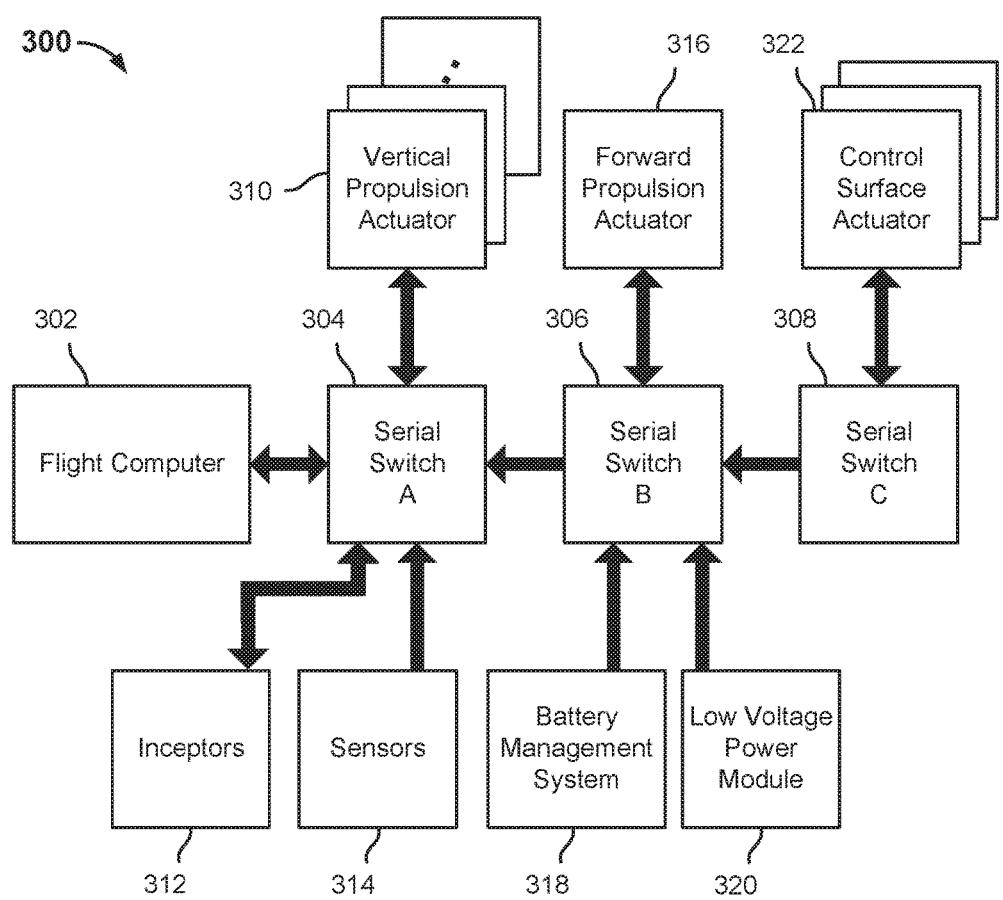
FIG. 3 is a block diagram illustrating an embodiment of a flight control system comprising a plurality of embedded systems.

FIG. 3 is a block diagram illustrating an embodiment of a flight control system comprising a plurality of embedded systems. In various embodiments, the flight control system 300 of FIG. 3 may be included in and used to control flight of an aircraft, such as aircraft 200 of FIG. 2. In various embodiments, the flight control system 300 of FIG. 3 includes a flight computer 302 and a variety of embedded systems configured to be controlled by and to communicate with flight computer 302. In various embodiments, flight code for one or more of flight computer 302 and other embedded systems shown in FIG. 3 is generated programmatically by a flight control protocol compiler as disclosed herein, such as flight control protocol compiler 102 of FIG. 1.

Referring further to FIG. 3, in the example shown, flight control system 300 includes, in addition to flight computer 302, a plurality of serial switches 304, 306, 308 configured to provide connectivity via serial data communications between and/or among embedded systems comprising flight control system 300 and flight computer 302. While in the example shown in FIG. 3 there is a single instance of each of serial switches 304, 306, and 308, in various embodiments a flight control system such as flight control system 300 may include two or more of each switch. In some embodiments, the number, type, and location of each switch, and the connections between each switch and any other switch, embedded system, and/or other component connected to the switch, may be defined in one or more definition files provided as input to a flight control protocol compiler as disclosed herein, such as definition files 104 provided to flight control protocol compiler 102 in the example shown in FIG. 1.

In the example shown, serial switch 304 has a direct connection to flight computer 302; to each of a plurality of vertical propulsion (e.g., lift fan) actuator controllers 310 (e.g., one controller per lift fan); to inceptors 312 (e.g., controllers that interpret manual control inputs and generate and send corresponding signals, for example voltages or other signals indicating one or more of position, force, displacement, relative movement, button depression, etc.); to sensors 314, and to serial switch 306. In various embodiments, serial switch 304 comprises one or more of flight code, generated as disclosed herein, and routing tables generated as disclosed herein to forward messages sent between entities connected to serial switch 304. For example, messages sent to flight computer 302 by one or more of vertical propulsion actuator controllers 310, inceptors 312, and sensors 314 may be forwarded by serial switch 304 to flight computer 302. Each message may be evaluated upon arrival on a corresponding ingress port or link of serial switch 302 to determine based on the ingress link and a message ID (or other indicating of message type) of the message to determine one or more destination endpoints for the message. For example, a routing table generated as disclosed herein may be consulted. A lookup may be performed based on the ingress link and message ID. The lookup may indicate one or more corresponding egress links via which the message is to be routed. Serial switch 304 is configured in various embodiments by software code generated as disclosed herein to perform the above lookup and forward the message via the egress link(s) indicated in the routing table.

Referring further to FIG. 3, flight control system 300 includes serial switch 306. In some embodiments, multiple instances of switch 306 may be included. In the example shown, serial switch 306 has connections to forward propulsion actuator controller 316. In some embodiments, an instance of forward propulsion actuator controller 316 for each forward propulsion actuator, such as propeller 210 of FIG. 2. In addition, serial switch 306 includes connections to battery management system (BMS) 318 and low voltage power module (LVPM) 320. In some embodiments, BMS 318 monitors and reports the health and state (e.g., charge level) of onboard batteries included on an aircraft to provide electrical power for actuator motors, servos, and the like, and to power auxiliary and control systems. In various embodiments, LVPM 320 provides low voltage power to onboard electronics, including the components shown in FIG. 3.

Finally, in the example shown serial switch 306 includes connections to serial switch 304 and serial switch 308, respectively. In various embodiments, serial switch 306 is configured to use routing tables generated as disclosed herein to forward via serial switch 304 messages to be delivered to flight computer 302. Such messages may be received from embedded systems connected directly to serial switch 306, such as forward propulsion actuator controller 316, BMS 318, and/or LVPM 320, or received from the sending embedded system indirectly, e.g., via serial switch 308. In various embodiments, serial switch 306 executes flight code generated as disclosed herein. The flight code includes computer instructions to use a routing table generated programmatically as disclosed herein to determine, based on an ingress link on which the message was received and a message ID (or other type indicating information), the egress link(s) via which the message is to be forwarded.

Referring further to FIG. 3, in the example shown flight control system 300 includes serial switch 308 with control surface actuator controllers 322 connected thereto. In various embodiments, serial switch 308 is configured to forward to serial switch 306, via the connection shown, messages received from control surface actuator controllers 322. In various embodiments, serial switch 308 is configured to forward to appropriate ones of control surface actuator controllers 322 commands or other messages generated by flight computer 302 and received at serial switch 308 via serial switch 306. Serial switch 308 performs a lookup as disclosed herein, based on ingress link and message ID (type), to determine the egress link(s) via which to forward the message.

In various embodiments, each entity shown as a single instance in FIG. 3 may include multiple instances, e.g., for redundancy and/or to distribute load across a plurality of switches, connections, and/or other entities.

As noted above, in various embodiments, definition files are parsed and used as disclosed herein to generate programmatically routing tables and other metadata to be used to enable embedded systems comprising a flight control system, such as flight control system 300 of FIG. 3, to communicate.

In some embodiments, techniques disclosed herein may be used to generate programmatically self-describing information about data streams communicated between embedded systems. Determining self-describing information about data streams at runtime typically is not possible. Reasons for doing this would be to convert binary data to self-describing data in a different format; presentation in a plotting program; related information about the data that is being received such as the message name, the size of the message's payload, the description of the message, the units of a field, or the value of a field. In various embodiments, datatypes and messages are defined in markup files, such as definition files 104 of FIG. 1. In some embodiments, flight code (e.g., flight code 106 of FIG. 1) is generated to permit inspection of metadata and values of data that is not self-describing. For example, we can convert a numerical value to a named value, access a field or an array at an arbitrary location in the structure using a name rather than a memory location, determine which message groups the message belongs to, read the description of the field, set the value of a field, print the value of a field, or convert an entire data stream to a different format that may or may not be self-describing.

Figure 4:
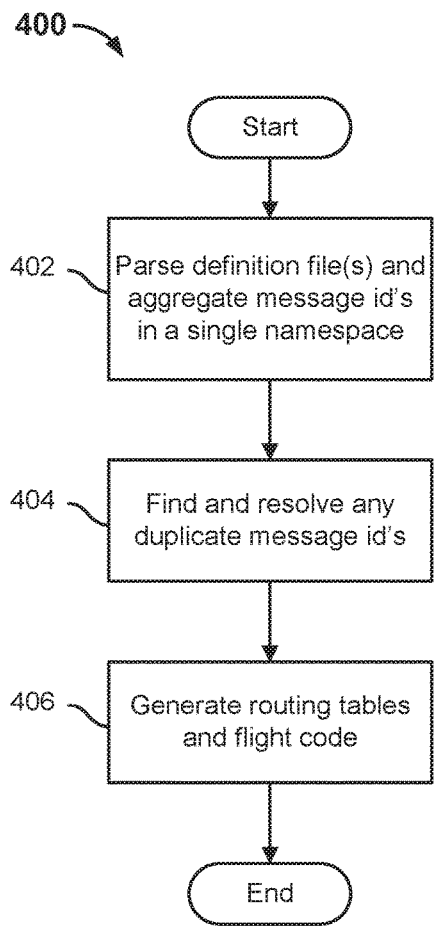
FIG. 4 is a flow chart illustrating an embodiment of a process to generate flight code and routing tables.

FIG. 4 is a flow chart illustrating an embodiment of a process to generate flight code and routing tables. In various embodiments, the process 400 of FIG. 4 may be performed by a flight control protocol compiler, such as flight control protocol compiler 102 of FIG. 1, based on one or more definition files, such as YAML definition files 104 of FIG. 1. In the example shown, one or more received definition files is/are parsed and message identifiers are aggregated in a single namespace (402). Any duplicate or otherwise conflicting message identifiers are identified and resolved (e.g., by prompting a human operator to resolve the ambiguity, by altering and/or augmenting one or more identifiers to make each unique within the global namespace, etc.) (404). Once any duplicate or otherwise conflicting message identifiers have been resolved (402, 404), routing tables and flight code to use the routing tables to route messages defined in the definition files are generated (406) and deployed. In various embodiments, routing tables based on message identifier and ingress link are built programmatically based on one or more of message definitions, data type definitions, and communication topology data represented in one or more definition files, such as definition files 104 of FIG. 1.

Figure 5:
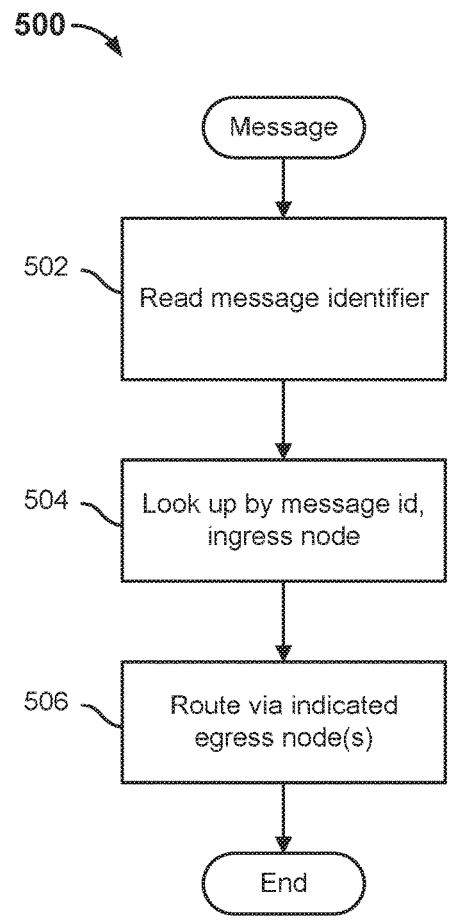
FIG. 5 is a flow chart illustrating an embodiment of a process to route messages between embedded systems.

FIG. 5 is a flow chart illustrating an embodiment of a process to route messages between embedded systems. In various embodiments, the process 500 of FIG. 5 may be performed with respect to each message received at a switch or other routing node comprising a flight control system, such as serial switches 304, 306, 308 of flight control system 300 of FIG. 3. In the example shown, for each received message an associated message identifier is read (502). A lookup is performed based on the message identifier and the ingress link on which the message arrived (504). The message is routed via one or more egress links determined by the lookup (506).

Figures 6, 7:
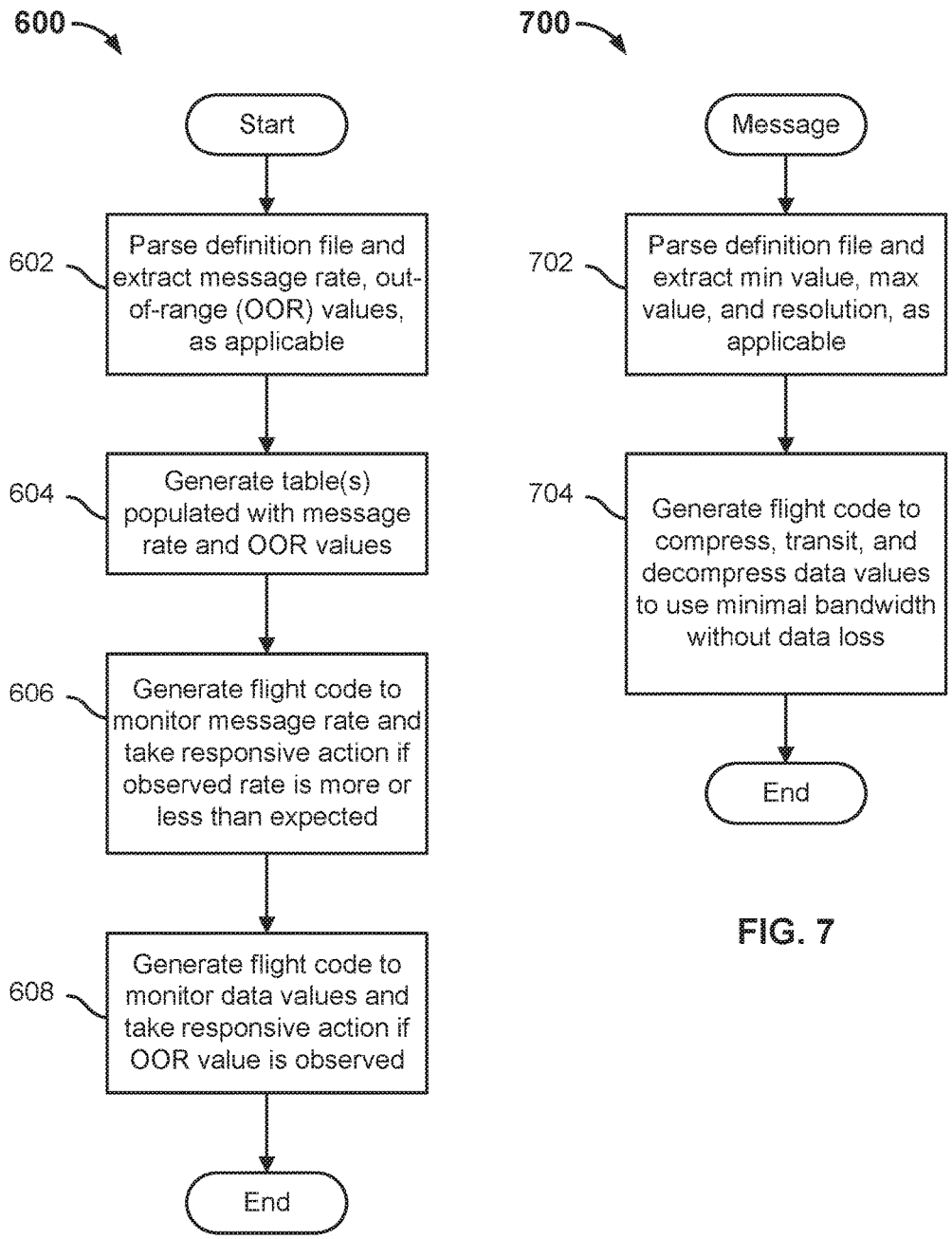
FIG. 6 is a flow chart illustrating an embodiment of a process to generate flight code and metadata to detect out of range values and monitor and respond to message rate.
FIG. 7 is a flow chart illustrating an embodiment of a process to generate flight code to compress and decompress data values communicated between embedded systems.

FIG. 6 is a flow chart illustrating an embodiment of a process to generate flight code and metadata to detect out of range values and monitor and respond to message rate. In various embodiments, the process 600 of FIG. 6 is performed by a flight control protocol compiler, such as flight control protocol compiler 102 of FIG. 1, based on one or more definition files, such as YAML definition files 104 of FIG. 1. In the example shown, one or more received definition files is/are parsed and one or more of message rate, expected minimum and/or maximum value, and/or other associated metadata are extracted (602). Tables, such as routing tables and/or associated auxiliary tables, are populated with message rate (frequency, schedule, etc.) and/or out-of-range (e.g., min, max) values (604). Flight code is generated programmatically to monitor message rate and/or data values, as applicable, and take responsive action if the observed message rate and/or data value is more or less than expected (606, 608). In some embodiments, flight code to monitor and take responsive action based on message rate and out-of-range values is generated for one or more communications node comprising a flight control system, such as serial switches 304, 306, and 308 of FIG. 3.

In some embodiments, flight code is generated to discard messages in excess of the expected rate. In some embodiments, an alert or error message is generated if a message that is expected is not received. In some embodiments, an alert or error message is generated if a message includes a data value that is less than the expected minimum and/or greater than the expected maximum, as defined in the definition file(s) based on which the flight code and associated message metadata were generated.

Communication bandwidth is a limited resource, on an aircraft as in other networks and systems. In an aircraft or other vehicle, it may be critical that messages be received in a predictable, deterministic, and timely manner. In various embodiments, techniques disclosed herein are used to generate programmatically flight code that minimizes the bandwidth consumed to communicate at least certain messages and/or to determine at compile time whether a communications topology described by definition files will have sufficient bandwidth to support messages defined by the definition files (and/or by other definition files).

FIG. 7 is a flow chart illustrating an embodiment of a process to generate flight code to compress and decompress data values communicated between embedded systems. In various embodiments, the process 700 of FIG. 7 is performed by a flight control protocol compiler, such as flight control protocol compiler 102 of FIG. 1, based on one or more definition files, such as YAML definition files 104 of FIG. 1. In the example shown, one or more definition files is/are parsed and for each of one or more data and/or message types the minimum value, maximum value, and resolution (e.g., smallest increment by which value increases/decreases) is extracted (702). Flight code is generated to compress deterministically, transmit, receive, and decompress instances of the message and/or data type (704).

In some embodiments, a flight control system as disclosed herein does not have enough bandwidth to send uncompressed through the system all data at the rate required and/or indicated by associated definition files. Traditional lossless compression algorithms may result in non-deterministic behavior. In some embodiments, the flight control system is required to be capable of sending and reading data at the same rate at all times. However, if the data is compressed using traditional lossless compression algorithms, one cannot guarantee the data will use the same amount of space and take the same amount of time to compress/decompress every single time.

In various embodiments, datatypes are defined in markup files, such as definition files 104 of FIG. 1, which are read into a protocol compiler, such as protocol compiler 102 of FIG. 1. The protocol compiler 102 generates C code and algorithms to deterministically compress data when it is sent "over the wire" (through a physical medium) by exploiting the data definitions. The algorithm exploits maximum, minimum, and resolution information found in the markup file.

For example, in some embodiments, an 8 bit unsigned integer can represent the numbers 0 through 255, so it takes 8 bits over the wire. If we define a field to be an 8 bit integer, but we know it will only take on a minimum value of 100 and a maximum value of 101, we can transmit a single bit over the wire rather than all 8 bits since we know 254 of them will be useless for our purposes. In this way, we lose no useful data, so it is effectively lossless. The compression ratio is defined as (uncompressed_size)/(compressed_size), which is 255 in this example.

The algorithm is as follows in some embodiments for encoding (done on the device sending the data):

Over-the-wire value=(actual_value−minimum_value)/(resolution)

The algorithm is as follows for decoding (done on the device receiving the data):

Decoded value=(wire_value*resolution)+minimum_value

The number of bits transmitted over the wire is as follows:

Bits over wire=$\log_2$((maximum_value−minimum_value)/resolution)+1

The above algorithms have constant time and space complexity, O(1). The generated functions also ensure the buffers that store compressed data are of sufficient size before encoding. This is a form of automated error checking. In other embodiments, other algorithms may be used to compress/decompress data deterministically.

Figure 8:
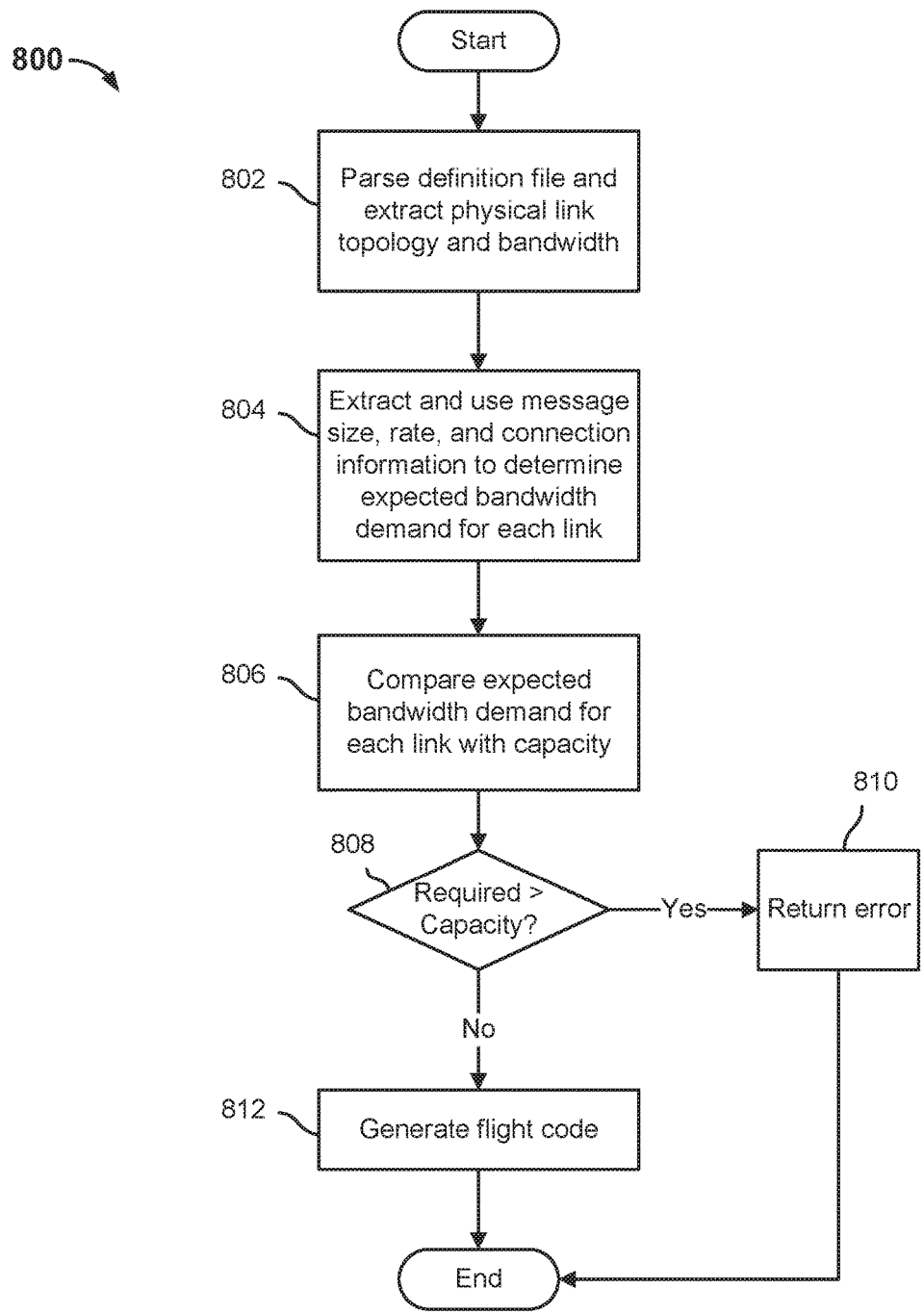
FIG. 8 is a flow chart illustrating an embodiment of a process to analyze bandwidth consumption associated with messages to be communicated between embedded systems.

FIG. 8 is a flow chart illustrating an embodiment of a process to analyze bandwidth consumption associated with messages to be communicated between embedded systems. In various embodiments, the process 800 of FIG. 8 is performed by a flight control protocol compiler, such as flight control protocol compiler 102 of FIG. 1, based on one or more definition files, such as YAML definition files 104 of FIG. 1. In the example shown, one or more definition files is/are parsed and entity definitions, communication topology, and bandwidth information are extracted (802). Message size, rate, and connection information extracted from the definition file(s) are used, in aggregate, to determine for each communication link the expected bandwidth required to support messages the definition file(s) indicate are to be sent via that link (804). For each link, the bandwidth required to support the messages described by the definition file(s) as being sent via that link are compared to the actual capacity (bandwidth) of the link, as defined in the definition file(s) (806). For any link for which the required bandwidth (based on messages as defined) exceeds the actual capacity of the link (808), an error is returned (810). In some embodiments, the error results in a notification being sent to a human operator to prompt system designers to resolve the error, such as by reducing the size, frequency, recipients, etc. of defined messages and/or by providing a higher capacity communications link. If for all links the required bandwidth (based on messages as defined) does not exceed actual capacity (808), the protocol compiler proceeds to generate flight code based on the definition file(s) (812).

In various embodiments, datatypes and messages are defined in markup files, such as definition files 104 of FIG. 1. In addition to these messages, the following are defined, in various embodiments: named physical connections in the system and their maximum bandwidth (i.e. serial connection with 6 megabit per second (Mbps) bandwidth); named groups of messages and an associated constant rate at which each message is sent in that message (i.e. message A is transmitted in group control_link1 at 100 Hz, message B is transmitted in group control_link1 at 50 Hz); which named groups of messages are to be transmitted over the named physical connection. In various embodiments, if at compile time a message group is determined to exceed the associated physical connection, an error occurs and the software is not generated unless/until the identified bandwidth deficiency has been resolved (806, 808, 810, 812).

In various embodiments, techniques disclosed herein enable a team of engineers to develop and deploy in a minimal amount of time a flight control system for an aircraft or other vehicle that includes a plurality of embedded systems that need to be able to communicate with one another. Conflicts (e.g., same message identifier, too much bandwidth consumed in aggregate, etc.) that might arise and require many hours to identify and resolve through human intervention in various embodiments are identified programmatically. Communication between embedded systems is provided by generating routing tables and/or other metadata programmatically, based on definition files, as disclosed herein. A shorter development timeline, and more complete and efficient use of just the required amount of communication bandwidth, may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store one or more definition files; and
a processor coupled to the memory and configured to:
parse the one or more definition files to extract flight control system definition data;
determined based on the flight control system definition data a communication topology comprising a set of entities of the flight control system and communication links between said entities;
generate programmatically based at least in part on the communication topology and message type definition data included in the extracted flight control system definition data a set of one or more routing tables including for each of a plurality of message types routing data to route a message of that message type; and
generate programmatically, based at least in part on the flight control system definition data, flight code to implement a flight control system defined at least in part by said flight control system definition data, said flight code including code to route messages according to said one or more routing tables, wherein the processor is further configured to aggregate message type identifiers across definition files and to identify any duplicate message type identifiers.

2. The system of claim 1, wherein the one or more definition files comprise one or more markup files.

3. The system of claim 1, wherein the one or more definition files comprise one or more YAML files.

4. The system of claim 1, wherein the flight code comprises C code.

5. The system of claim 1, wherein the flight code includes flight computer code.

6. The system of claim 1, wherein the flight code includes software code to be implemented by a comprising a serial switch.

7. The system of claim 1, wherein the one or more routing tables include for each of at least a subset of message types an entry indexed by ingress link and message identifier.

8. The system of claim 7, wherein for a given entry indexed by ingress link and message identifier the one or more routing tables indicate an egress link on which an associated received message is to be forwarded.

9. The system of claim 1, wherein the flight control system definition data includes for a message type one or both of a minimum value and a maximum value.

10. The system of claim 9, wherein the processor is further configured to generate message metadata reflecting said one or both of a minimum value and a maximum value.

11. The system of claim 10, wherein the processor is further configured to generate flight code configured to detect that an instance of a message of the message type includes a data value that falls outside of a range of expected values indicated by said one or both of a minimum value and a maximum value.

12. The system of claim 1, wherein the flight control system definition data includes for a message type data indicating an expected rate at which messages of the message type will be communicated.

13. The system of claim 12, wherein the processor is further configured to generate flight code to take responsive action in the event message of message type are communicated other than at the expected rate.

14. The system of claim 13, wherein the processor is configured to generate flight code to drop messages of the message type that exceed the expected rate.

15. The system of claim 13, wherein the processor is configured to generate flight code to provide an alert if messages of the message type are observed to arrive at less than the expected rate.

16. The system of claim 1, wherein the processor is configured to generate flight code to compress and decompress message data to be transmitted via communication links defined in the flight control system definition data.

17. The system of claim 16, wherein the generated flight code compresses and decompressed message data based at least in part on one or more of maximum value, minimum value, and resolution data indicated in the flight control system definition data.

18. A method, comprising:
receiving one or more definition files;
parsing the one or more definition files to extract flight control system definition data;
determining based on the flight control system definition data a communication topology comprising a set of entities of the flight control system and communication links between said entities;
generating programmatically based at least in part on the communication topology and message type definition data included in the extracted flight control system definition data a set of one or more routing tables including for each of a plurality of message types routing data to route a message of that message type; and
generating programmatically, based at least in part on the flight control system definition data, flight code to implement a flight control system defined at least in part by said flight control system definition data, said flight code including code to route messages according to said one or more routing tables, wherein the processor is further configured to aggregate message type identifiers across definition files and to identify any duplicate message type identifiers.

19. A computer program product embodied in a non-transitory computer readable medium, comprising computer instructions for:
receiving one or more definition files;
parsing the one or more definition files to extract flight control system definition data:
determining based on the flight control system definition data a communication topology comprising a set of entities of the flight control system and communication links between said entities;
generating programmatically based at least in part on the communication topology and message type definition data included in the extracted flight control system definition data a set of one or more routing tables including for each of a plurality of message types routing data to route a message of that message type; and
generating programmatically, based at least in part on the flight control system definition data, flight code to implement a flight control system defined at least in part by said flight control system definition data, said flight code including code to route messages according to said one or more routing tables, wherein the processor is further configured to aggregate message type identifiers across definition files and to identify any duplicate message type identifiers.

* * * * *